(No Model.)

R. M. McBRIDE.
VEHICLE SPINDLE.

No. 504,499. Patented Sept. 5, 1893.

Witnesses
A. B. Blackwood
B. W. Sommers

Inventor
R. M. McBride
By F. O. McCleary
Attorney

UNITED STATES PATENT OFFICE.

ROBERT M. McBRIDE, OF HARLENSBURG, PENNSYLVANIA.

VEHICLE-SPINDLE.

SPECIFICATION forming part of Letters Patent No. 504,499, dated September 5, 1893.

Application filed April 20, 1893. Serial No. 471,080. (No model.)

*To all whom it may concern:*

Be it known that I, ROBERT M. MCBRIDE, a citizen of the United States, residing at Harlensburg, in the county of Lawrence and State of Pennsylvania, have invented an Improvement in Vehicle-Spindles, of which the following is a specification.

The invention relates to spindles for vehicles, the object being to diminish the friction, and avoid heating and binding of the spindle and wheel, and thus secure an easier and freer draft than is possible with the ordinary spindle.

The invention consists in the improved construction of spindles hereinafter fully described, and specified in the appended claim.

Figure 1:
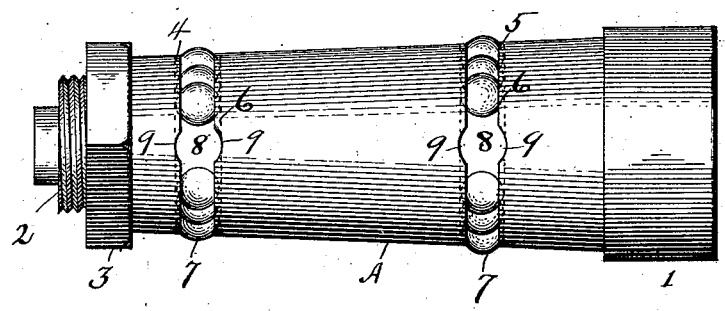
Figure 2:
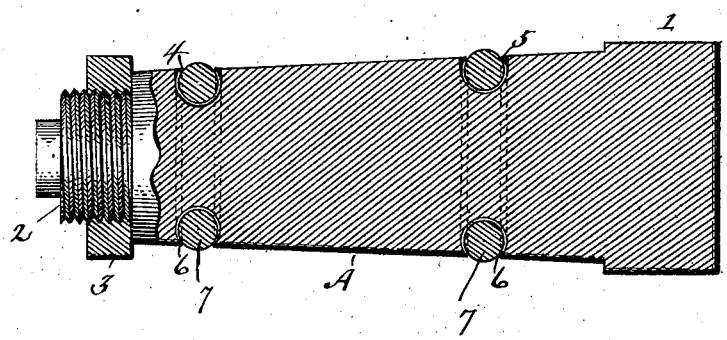

In the accompanying drawings, Figure 1, is an elevation of a spindle embodying my improvements, and Fig. 2, is a central longitudinal section of the same.

A indicates the spindle of tapering form, and provided with an inner shoulder 1, and an outer screw-threaded end 2, adapted to receive the usual retaining nut 3.

4 and 5 indicate annular grooves formed in the outer surface of the spindle, and having under-cut edges 6 as shown. These grooves approximate a circle in cross-section, as clearly shown in Fig. 2, and serve as ways for a series of steel balls 7. These balls project slightly above the periphery of the spindle as shown to serve as anti-friction bearings for the wheel hubs. Each of the grooves is formed with an opening 8 through which the balls are inserted. These openings are formed by recessing the edges of the grooves at opposite points 9. It will be apparent that the balls 7 may be readily removed and replaced when worn, through the openings 8, and that when in place in the grooves they will travel therein as the wheel revolves on the spindle, thus taking up, or compensating for the friction.

I am aware that it is not broadly new to provide vehicle spindles with anti-friction balls, or ball-bearings arranged to travel in ways, and hence I do not claim such a spindle broadly, but by the construction shown and described I avoid the employment of a sleeve or boxing to keep the balls 7 in place, and provide a simple but effective bearing.

What I claim is—

A vehicle spindle formed with one or more annular grooves having under-cut edges 6 and provided with entrance openings 8, arranged at the top of the spindle in combination with anti-friction balls 7, adapted to be inserted through said openings, substantially as described.

In witness whereof I have hereto set my hand in the presence of two attesting witnesses.

ROBERT M. MCBRIDE.

Attest:
W. S. ARMSTRONG,
GEO. W. PRINGLE.